(12) United States Patent
Nefcy et al.

(10) Patent No.: US 9,457,787 B2
(45) Date of Patent: Oct. 4, 2016

(54) METHOD AND SYSTEM TO MANAGE DRIVELINE OSCILLATIONS WITH MOTOR TORQUE ADJUSTMENT

(75) Inventors: Bernard D. Nefcy, Novi, MI (US); Marvin Paul Kraska, Dearborn, MI (US); Daniel Scott Colvin, Farmington Hills, MI (US); Christopher Alan Lear, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 423 days.

(21) Appl. No.: 13/613,651

(22) Filed: Sep. 13, 2012

(65) Prior Publication Data

US 2013/0297109 A1 Nov. 7, 2013

Related U.S. Application Data

(60) Provisional application No. 61/643,839, filed on May 7, 2012.

(51) Int. Cl.
*B60L 9/00* (2006.01)
*B60W 10/02* (2006.01)
(Continued)

(52) U.S. Cl.
CPC ............... *B60W 10/02* (2013.01); *B60L 7/12* (2013.01); *B60L 11/14* (2013.01); *B60W 10/08* (2013.01); *B60W 20/00* (2013.01); *B60W 30/20* (2013.01); *B60K 2006/4825* (2013.01); *B60L 2240/421* (2013.01); *B60L 2240/423* (2013.01);
(Continued)

(58) Field of Classification Search
CPC ..... B60W 20/00; B60W 10/08; B60W 10/06

USPC ....... 701/22, 51, 60, 67, 87; 477/5, 175, 180
See application file for complete search history.

(56) References Cited

U.S. PATENT DOCUMENTS 6,193,628 B1   2/2001   Hrovat et al.
6,574,535 B1   6/2003   Morris et al.
(Continued)

FOREIGN PATENT DOCUMENTS

CN   101067452 A   11/2007
CN   101087703 A   12/2007
(Continued)

OTHER PUBLICATIONS

Syed et al.—"Active Damping Wheel-Torque Control System to Reduce Driveline Oscillations in a Power-Split Hybrid Electric Vehicle"; IEEE Transactions on Vehicular Technology, vol. 58, No. 9, Nov. 2009; 17 pages.

(Continued)

*Primary Examiner* — Shardul Patel
(74) *Attorney, Agent, or Firm* — David B. Kelley; Brooks Kushman P.C.

(57) ABSTRACT

A system and method for controlling a vehicle having an electric traction motor coupled to a transmission by a clutch include modifying traction motor torque in response to the difference between rotational speed of a driveline component and the filtered rotational speed of the driveline component to reduce driveline oscillation when the clutch is locked. The traction motor torque may be modified in response to a vehicle event that may otherwise induce driveline oscillations, such as a transmission ratio change or regenerative braking, for example.

16 Claims, 3 Drawing Sheets

(51) Int. Cl.
*B60W 20/00* (2016.01)
*B60W 30/20* (2006.01)
*B60L 7/12* (2006.01)
*B60L 11/14* (2006.01)
*B60W 10/08* (2006.01)
*B60W 30/18* (2012.01)
*B60K 6/48* (2007.10)
*B60W 50/00* (2006.01)

(52) U.S. Cl.
CPC ..... *B60L 2240/441* (2013.01); *B60L 2240/443* (2013.01); *B60L 2240/507* (2013.01); *B60L 2240/80* (2013.01); *B60W 30/18127* (2013.01); *B60W 2050/0056* (2013.01); *B60W 2710/023* (2013.01); *B60W 2710/083* (2013.01); *Y02T 10/6252* (2013.01); *Y02T 10/642* (2013.01); *Y02T 10/70* (2013.01); *Y02T 10/7077* (2013.01); *Y02T 10/7258* (2013.01)

(56) References Cited

U.S. PATENT DOCUMENTS

| | | | |
|---|---|---|---|
| 6,974,402 B2 | 12/2005 | Colvin et al. | |
| 6,991,585 B2 | 1/2006 | Colvin et al. | |
| 7,024,290 B2* | 4/2006 | Zhao | B60K 6/445 180/65.6 |
| 7,908,063 B2 | 3/2011 | Sah | |
| 8,010,263 B2 | 8/2011 | Morris | |
| 8,195,352 B2* | 6/2012 | Morris | B60W 20/15 180/65.1 |
| 2005/0181907 A1 | 8/2005 | Colvin et al. | |
| 2005/0250618 A1 | 11/2005 | Colvin et al. | |
| 2006/0025905 A1* | 2/2006 | Zhao | B60K 6/445 701/22 |
| 2007/0225887 A1 | 9/2007 | Morris | |
| 2007/0260381 A1 | 11/2007 | Sah | |
| 2008/0057248 A1* | 3/2008 | Hatchett | B32B 25/08 428/36.91 |
| 2009/0265052 A1* | 10/2009 | Muta | B60W 10/06 701/22 |
| 2010/0292879 A1 | 11/2010 | Luedtke | |
| 2011/0018487 A1* | 1/2011 | Nagase | B62D 5/0463 318/800 |
| 2011/0178686 A1 | 7/2011 | Morris | |
| 2012/0065821 A1* | 3/2012 | Hessell | B60W 10/08 701/22 |
| 2013/0002176 A1* | 1/2013 | Kim | F02N 11/04 318/376 |
| 2013/0184918 A1* | 7/2013 | Motosugi | B60L 15/20 701/22 |
| 2013/0296128 A1* | 11/2013 | Nefcy | F16D 48/02 477/5 |
| 2014/0195082 A1* | 7/2014 | Takamura | B60L 11/14 701/22 |

FOREIGN PATENT DOCUMENTS

| | | |
|---|---|---|
| CN | 102050112 A | 5/2011 |
| EP | 1564055 A2 | 8/2005 |
| WO | 2012053508 A1 | 4/2012 |

OTHER PUBLICATIONS d'Ambrosio—"Robust control for Active damping of an Hybrid Vehicle Driveline Shuffle"; Proceedings of the 10th Mediterranean Conference on Control and Automation—MED 2002 Lisbon, Portugal, Jul. 9-12, 2002; 10 pages.

* cited by examiner

METHOD AND SYSTEM TO MANAGE DRIVELINE OSCILLATIONS WITH MOTOR TORQUE ADJUSTMENT

CROSS-REFERENCE TO RELATED APPLICATIONS

This application claims the benefit of U.S. provisional Application No. 61/643,839 filed May 7, 2012, the disclosure of which is incorporated in its entirety by reference herein.

TECHNICAL FIELD

The present disclosure relates to a vehicle having an electrically powered traction motor and a control system for controlling the vehicle.

BACKGROUND

Unwanted driveline oscillations may occur in many types of vehicles, including a hybrid electric vehicle (HEV) that includes an internal combustion engine (ICE) and an electrically powered traction motor to propel the vehicle, as well as a battery electric vehicle (BEV) that uses a battery or fuel cell to power a traction motor without an ICE. Driveline oscillations may be introduced by shifting gears, starting the engine, regenerative braking, engagement/disengagement of clutches, and various other disturbances. In these situations, the operator of the vehicle may experience undesirable oscillations within the cabin of the vehicle. Previous solutions to driveline oscillations include measuring a speed difference between two different driveline components to detect windup and associated oscillation, and adjusting a torque command to the electric motor based on that difference. There is currently a need to more effectively manage the control of various vehicle systems to reduce or eliminate perceptible driveline oscillations.

SUMMARY

A method for controlling a vehicle having a traction motor coupled to a driveline includes modifying traction motor torque in response to a difference between a rotational speed of a driveline component and a filtered rotational speed of the driveline component to reduce driveline oscillations. In one embodiment, the traction motor is selectively coupled to vehicle traction wheels by a clutch disposed therebetween and modifying the traction motor torque is performed only when the clutch is locked. The driveline component may include a traction motor output shaft, or any other driveline component having a rotational speed correlated with the traction motor output shaft. In one embodiment, the method includes filtering the rotational speed of the driveline component using a first low-pass filter having a cutoff frequency that varies as a function of the rotational speed of the driveline component and filtering the rotational speed of the driveline component using a second low-pass filter having a fixed calibratable cutoff frequency higher than the cutoff frequency of the first low-pass filter. The method may include integrating the difference between the rotational speed and the filtered rotational speed, and modifying the traction motor torque in response to a difference between output of the second low-pass filter and the integrated difference between the rotational speed and the filtered rotational speed. In various embodiments, the vehicle includes a transmission and modifying the traction motor torque comprises modifying the traction motor torque in response to a ratio change of the transmission. Embodiments may also include modifying the traction motor torque in response to activation of a vehicle regenerative braking system.

Embodiments according to the present disclosure may include a system for controlling a powertrain of a vehicle having a traction motor for powering wheels of the vehicle and a controller in communication with the traction motor with the controller configured to modify traction motor torque in response to a difference between a rotational speed of a driveline component and a filtered rotational speed of the driveline component to reduce driveline oscillations. In one embodiment, the system includes a clutch disposed between the traction motor and the wheels of the vehicle and the controller modifies the traction motor torque when the clutch is locked. In some embodiments, the controller modifies the traction motor torque only when clutch slip is below a corresponding threshold. In one embodiment, the controller filters the rotational speed of the driveline component using a first low-pass filter having a cutoff frequency that varies as a function of the rotational speed of the driveline component, and filters the rotational speed of the driveline component using a second low-pass filter having a cutoff frequency higher than the cutoff frequency of the first low-pass filter.

Embodiments according to the present disclosure may also include a system or vehicle having a multiple ratio transmission disposed between a traction motor and vehicle fraction wheels, a first clutch selectively coupling an internal combustion engine to the traction motor, and a second clutch selectively coupling the traction motor to the transmission. A controller in communication with the traction motor, internal combustion engine, and the transmission modifies the fraction motor torque in response to a ratio change of the transmission. In one embodiment, the system or vehicle includes a regenerative braking system where the controller modifies the traction motor torque in response to activation of the regenerative braking system.

Various embodiments of the present disclosure include a hybrid electric vehicle having an engine, a fraction motor selectively coupled to the engine by a first clutch, a traction battery electrically connected to the traction motor, a step-ratio transmission selectively coupled to the traction motor by a second clutch, and a controller in communication with the traction motor, the engine, and the transmission. The controller is configured to modify traction motor torque when the second clutch is locked in response to a difference between a rotational speed of a driveline component and a filtered rotational speed of the driveline component. In various embodiments, the second clutch is disposed within the transmission or a transmission component, such as a torque converter. The controller may include a first low-pass filter having a cutoff frequency that varies as a function of the rotational speed of the driveline component, and a second low-pass filter having a cutoff frequency higher than the cutoff frequency of the first low-pass filter. Traction motor torque may be controlled in response to a ratio change of the transmission and/or activation of a regenerative braking system. Torque modification or correction to reduce or dampen driveline oscillations may be performed for a predetermined time after an associated trigger event, such as a transmission ratio change or activation of the regenerative braking system.

Various embodiments according to the present disclosure provide associated advantages. For example, driveline torque management according to embodiments of the present disclosure reduces driveline oscillations that may otherwise result from transmission ratio changes, particularly during regenerative braking of an electric or hybrid electric vehicle. However, the torque management strategy may be used in response to any gear change or disturbance when a vehicle launch clutch is locked, such as power-on gear changes and after engine pull-up, for example. Systems and methods of various embodiments use rotational speed of a single driveline component, such as the traction motor, to modify traction motor torque and improve drivability by reducing or eliminating driveline oscillations.

The above advantages and other advantages and features will be readily apparent from the following detailed description of the preferred embodiments when taken in connection with the accompanying drawings.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale; some features may be exaggerated or minimized to show details of particular components. Specific structural and functional details disclosed herein are therefore not to be interpreted as limiting, but merely as a representative basis for teaching one skilled in the art to variously employ the present invention. As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to systems or methods for adjusting the torque of a traction motor to reduce or eliminate oscillations in the drivetrain of an electric or hybrid electric vehicle. However, the teachings of the present disclosure may also be used in other applications. Those of ordinary skill in the art may recognize similar applications or implementations with other vehicle configurations or technologies.

Figure 1:
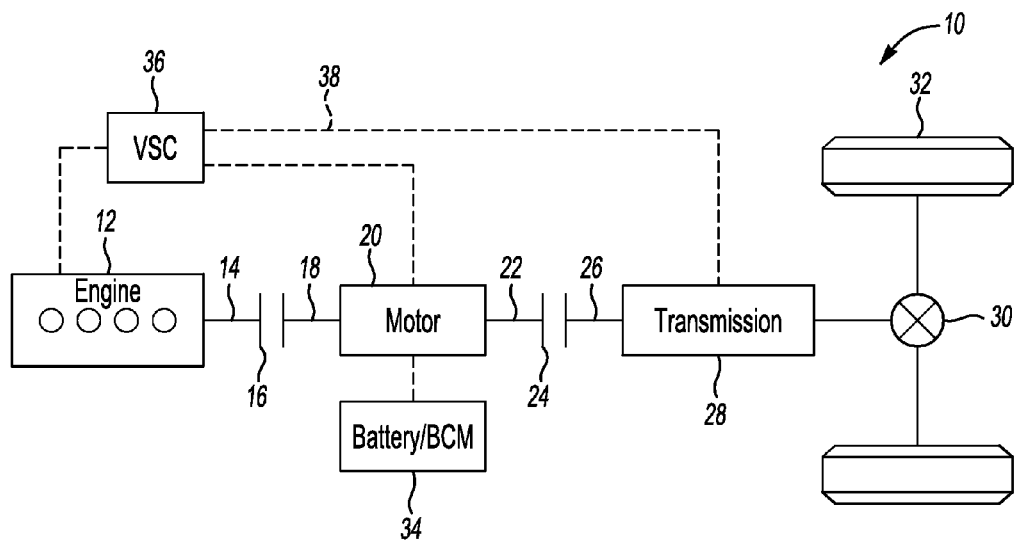
FIG. 1 is a schematic representation of a powertrain system according to embodiments of the present disclosure.

Referring to FIG. 1, a representative vehicle 10 is schematically shown with a hybrid electric drivetrain. Vehicle 10 is includes an internal combustion engine (ICE) 12 having an output shaft 14 connected to a first clutch implemented by disconnect clutch 16. Those of ordinary skill in the art will recognize that driveline torque management according to the present disclosure may also be used in electric vehicles that do not include an ICE. Disconnect clutch 16 drives an input shaft 18 to an electric machine that functions primarily as a traction motor 20. Traction motor 20 may also be operated as a generator to generate electric energy to be stored for subsequent use as generally known. Disconnect clutch 16 enables engine 12 and motor 20 to be selectively coupled and decoupled from one another. An output shaft 22 of motor 20 is connected to a second clutch implemented by launch clutch 24. Launch clutch 24 drives an input shaft 26 of a transmission 28, implemented by an automatic step-ratio gear-change transmission in one embodiment. In one embodiment, launch clutch 24 is implemented by a frictional or mechanical torque converter bypass clutch of an associated hydrodynamic torque converter (not specifically illustrated). The present disclosure is generally independent of the particular type of transmission, but may be particularly useful with step-ratio transmissions that may introduce torque disturbances to the driveline that can contribute to driveline oscillations associated with ratio changes of the transmission. Similar to disconnect clutch 16, launch clutch 24 enables motor 20 and transmission 28 to be selectively coupled and decoupled from one another. An output shaft of transmission 28 drives a differential gear element 30, which transfers power to wheels 32.

Depending on the particular application and implementation, various types of electrical generation and/or storage devices may be used to power traction motor 20. In one embodiment, a high-voltage traction battery 34 is electrically connected to traction motor 20. Battery 34 selectively supplies electric energy to drive traction motor 20, and also selectively receives and stores electric energy from traction motor 20 when traction motor 20 is acting as a generator, such as during regenerative braking, for example. A vehicle system controller (VSC) 36 and/or multiple controllers control the operation of engine 12, traction motor 20, and transmission 28 through electrical connection 38. Battery 34 may also be electrically connected to VSC 36, and/or it may have its own battery control module (BCM) to control charging, discharging, and various other battery functions.

Vehicle 10 may include a regenerative braking module or controller 90 to control regenerative braking of one or more vehicle wheels 32. Regenerative braking module or controller 90 may be implemented by hardware and/or software and may be integrated within VSC 36 in some applications and implementations. Regenerative braking may be activated in response to various vehicle and/or ambient operating conditions or events, such as depressing a brake pedal, releasing an accelerator pedal, or when traveling downhill, for example.

Vehicle 10 as illustrated in the representative embodiment of FIG. 1 has a hybrid electric drivetrain in which engine 12, motor 20, and transmission 28 are selectively coupled in series to propel the vehicle. However, it should be understood that for purposes of the present disclosure, vehicle 10 may have various other powertrain configurations, such as a power split driveline, in which an engine is connected to a planetary gear set with clutches within the transmission, and a generator is connected to an electric motor that may power the wheels in parallel with the engine. The vehicle 10 may also be a battery electric vehicle (BEV) in which an engine is not included, and the motor 20 and battery 34 are selectively coupled to a driveline with clutches to power wheels 32 without an engine. Furthermore, additional components are also contemplated to be included in the vehicle of the present disclosure, such as a separate starter motor to start the engine 12. In short, while the present disclosure makes reference to a vehicle 10 with driveline components connected in series, it is contemplated that the current disclosure may apply to other types of vehicle drivelines that include an electric traction motor to power the wheels, with or without an engine.

The disconnect clutch 16 of the driveline selectively couples the engine 12 to the motor 20. The VSC 36 and/or another controller controls the pressure of the disconnect clutch 16. When a sufficient pressure is commanded, the disconnect clutch 16 locks and the output of the engine 12 rotates at an equivalent speed with the input of the motor 20. This allows the engine 12 to transfer power through the motor 20 and into the transmission 28. When a pressure less than sufficient is commanded, the disconnect clutch 16 slips and the engine 12 may be partially or completely disengaged from the motor 20 so that the motor 20 can transfer power through the transmission 28 without the losses associated with engine 12, thereby reducing fuel consumption.

Similarly, the launch clutch 24 operates to engage the output of the motor 20 with the input of the transmission 28. The VSC 36 again controls the pressure of the launch clutch 24. The launch clutch 24 also slips when an amount of pressure less than full pressure is commanded by the VSC 36. The slipping of the launch clutch 24 occurs when shaft 22 is rotating faster than shaft 26. When the launch clutch 24 is slipping, torque output of the motor 20 is not fully transferred downstream of the motor 20, but may rather be used to start the engine 12, for example, as explained below.

In operation, the vehicle 10 may be powered by either or both of the engine 12 and the motor 20. Beginning from a stop with the engine 12 off, for example, the disconnect clutch 16 may be disabled to isolate the shafts 14, 18 from each other, the launch clutch 24 may be enabled to lock the shafts 22, 26 together, and the motor 20 may be activated to cause the wheels 32 to move. As a demand for acceleration increases, the launch clutch 24 may be caused to slip and the disconnect clutch 16 may be enabled to lock the shafts 14, 18 together. The engine 12 may then be started and brought up to a desired speed. The amount of slip experienced by the launch clutch 24 may then be reduced as the speed of the shafts 14, 18, 22 approaches the speed of the shaft 26 and the output shaft of the transmission 28.

The VSC 36 receives information from one or more sensors (not shown) placed throughout the driveline. The VSC 36 can monitor rotational speeds of the engine 12, the motor 20, and other components in the driveline such as shafts 14, 18, 22, 26, and the axle shaft that connects the differential gear element 30 to the wheels 32. When the launch clutch 24 is locked and not slipping, a rotational speed of any driveline component on the output side of the motor 20 indicates the rotational speed of the motor 20, after gear ratio calculations. When the launch clutch 24 is slipping, the rotational speed of any driveline component downstream of shaft 26 indicates the speed of the vehicle after gear ratio calculations, while the rotational speeds of shafts 18, 22 indicate rotational speed of the motor 20. In such a scenario, the rotational speeds of shafts 18, 22 may differ from the rotational speed of shaft 26.

Figure 2:
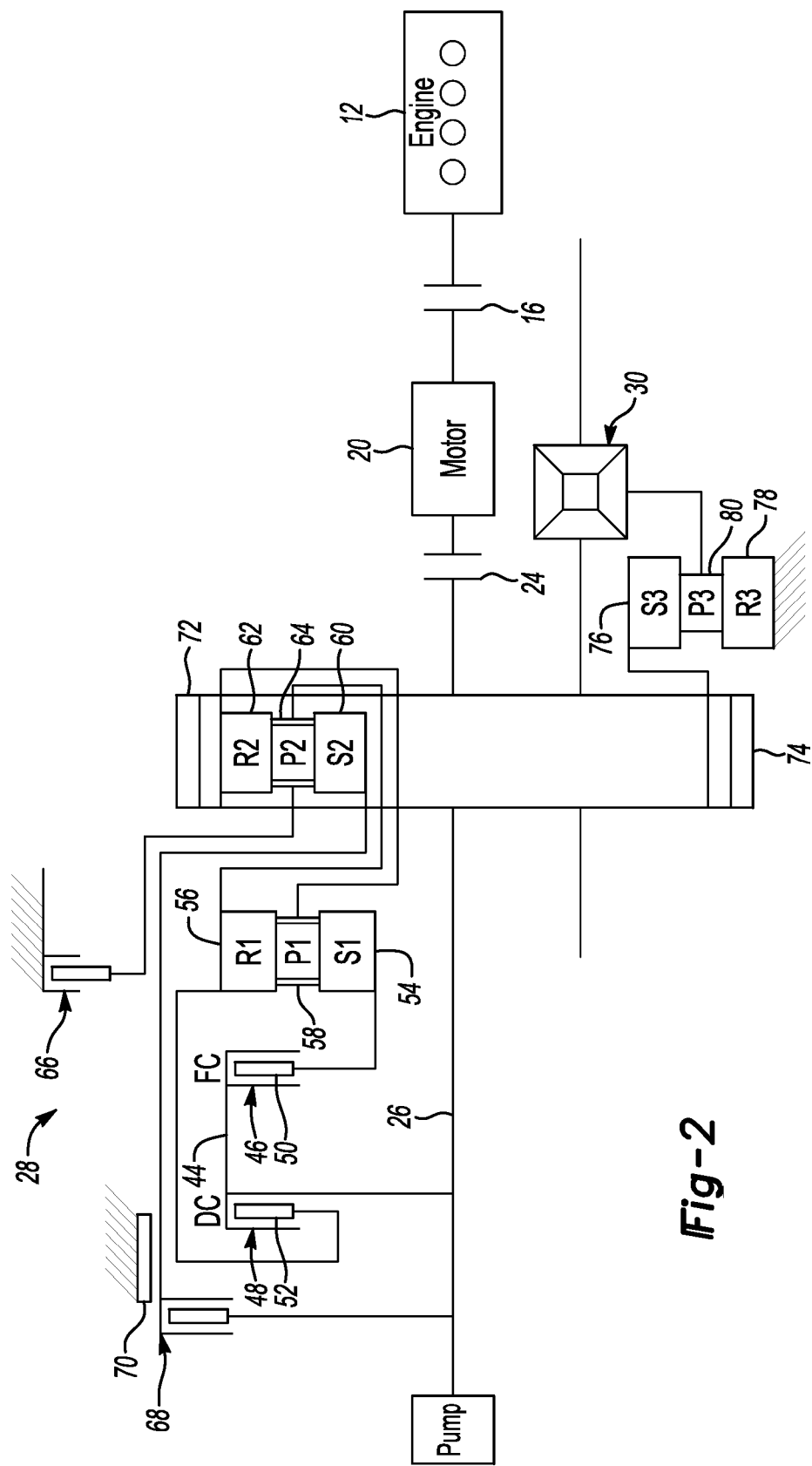
FIG. 2 is a schematic representation of a transmission according to embodiments of the present disclosure.

Referring to FIG. 2, the transmission 28 is shown in detail, along with other vehicle components. The transmission 28 is driven by the input shaft 26 that receives torque from the engine 12 and/or the motor 20 through the use of clutches 16, 24, as previously described. The transmission input shaft 26 is operatively connected to a first portion 44 of a forward clutch (FC) 46. The first portion 44 of the forward clutch 46 is also the first portion of a direct clutch (DC) 48. The forward clutch 46 and the direct clutch 48 each have respective second portions 50, 52 which are operatively connected to a respective torque element within the transmission 28.

The second portion 50 of the forward clutch 46 is operatively connected to a first sun gear (S1) 54. The second portion 52 of the direct clutch 48 is operatively connected to a first ring gear (R1) 56. A first planetary gear set includes the first sun gear 54, the first ring gear 56, and a first planetary carrier (P1) 58. The first planetary gear set is operatively connected to a second planetary gear set. The second planetary gear set includes a second sun gear (S2) 60, a second ring gear (R2) 62, and a second planetary carrier (P2) 64. The second planetary carrier 64 is connected to the first ring gear 56 of the first planetary gear set, and also to a low-and-reverse brake (L/R) 66. The second sun gear 60 is connected to a reverse clutch (RC) 68 which may include a friction brake 70. The reverse clutch 68 is also operatively connected to the transmission input shaft 26.

The ring gear 62 defines a sprocket for a chain drive, indicated generally at 72. The chain drive 72 drives a sprocket 74, which in turn, drives a third sun gear (S3) 76 of a third planetary gear set. The third planetary gear set also includes a third ring gear (R3) 78 and a third planetary carrier (P3) 80. The ring gear 78 is grounded to the transmission housing, while the planetary carrier 80 is attached to the differential gear element 30. The differential gear element 30 transfers torque to wheels 32, as described previously with reference to FIG. 1.

FIG. 2 illustrates a launch clutch 24 between the transmission 28 and the motor 20. It should be understood that clutches 46 and 48 within the transmission 28 may be present in place of, or in combination with, launch clutch 24. FIG. 2 shows all clutches 24, 46 and 48 together as an illustration of possible clutch locations that all work to selectively couple the motor 20 to the transmission 28 and allow for slip so that the motor 20 can work to start the engine 12 and power the wheels 32. It should be understood that slipping may be commanded to forward clutch 46 for the same purposes as slipping the launch clutch 24. The slipping described in this disclosure in regards to launch clutch 24 is not meant to be limited to only launch clutch 24, but may also apply to clutches 46 and 48 depending on the configuration of the driveline and the transmission 28.

Referring to FIGS. 1 and 2, when the VSC 36 commands a start of the engine 12 to provide torque to the wheels, a command is given to the launch clutch 24 to reduce pressure in the clutch 24 to allow the clutch 24 to slip. If the launch clutch 24 is already slipping when the VSC commands a start of the engine 12, pressure can be further reduced to allow the clutch 24 to further disengage and allow for more slip. Once sufficient slipping of the launch clutch 24 is present, the disconnect clutch 16 is engaged and the motor 20 rotates engine 12 to bring it up to speed so that it may begin to combust fuel and provide torque. By partially disengaging the launch clutch 24 during engine start, the vehicle driveline, including the vehicle wheels 32, is at least partially isolated from engine torque disturbances, so that starting the engine 12 may go unnoticed by a vehicle occupant. Similarly, when the engine 12 is requested to stop, the VSC 36 commands a pressure reduction in the disconnect clutch 16 to disengage the engine 12 from the motor 20. The motor 20 may then provide sufficient torque requests to the wheels 32 until power demand increases to a level in which the engine 12 must start again.

During operation, the driveline of the vehicle 10 may experience unwanted oscillations. For example, when shifting between gears, circumstances may exist that excite an oscillation of the output shaft 22 of the motor 20. These oscillations may increase to a level that is felt within the cabin of the vehicle and noticed by a vehicle occupant. A solution to dampen and combat these oscillations is provided with reference to FIGS. 3-5.

Figure 3:
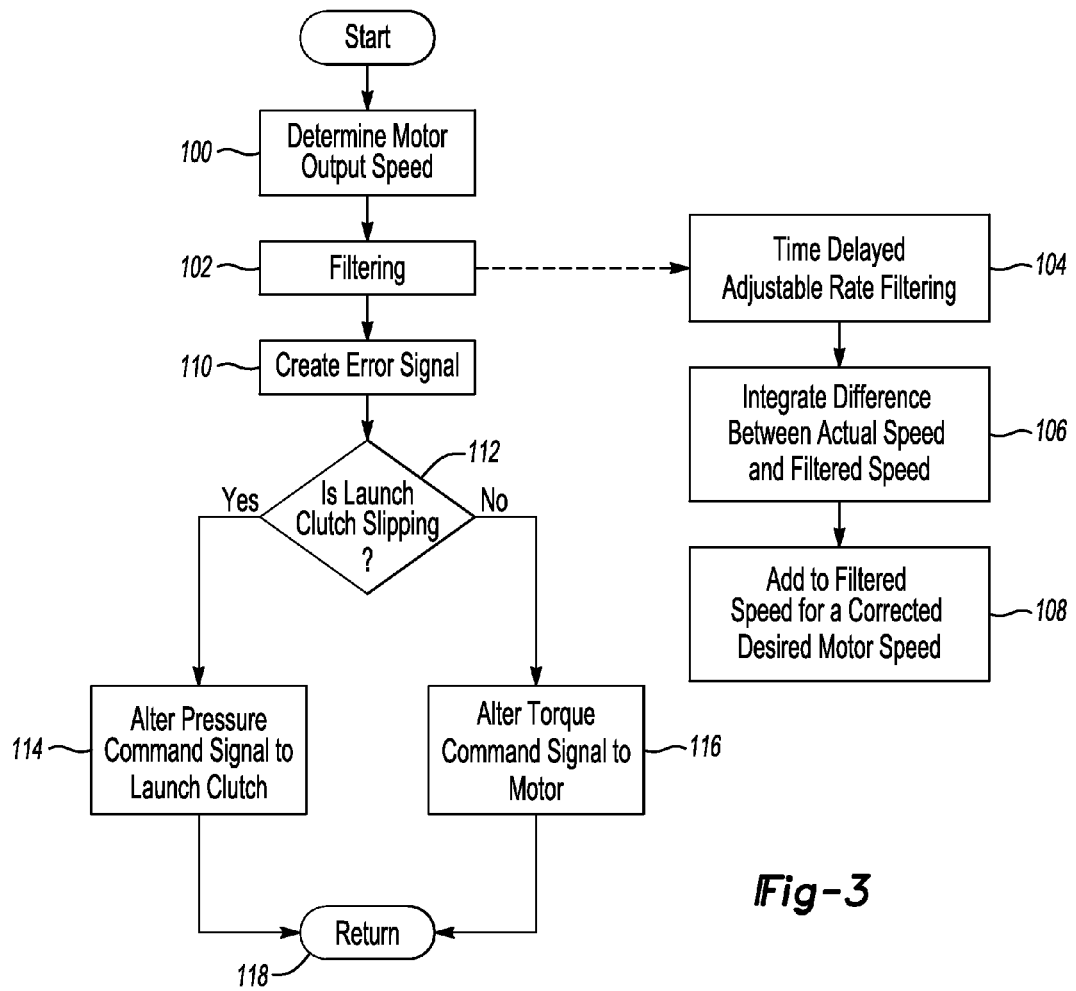
FIG. 3 is a flow chart illustrating operation of a system or method for reducing or damping driveline oscillations according to various embodiments of the present disclosure.

Referring to FIG. 3, a high level flowchart illustrates a system and method to dampen driveline oscillations in accordance with the present disclosure. At 100, the VSC or other controller receives a signal indicative of a rotational speed of a driveline component. The driveline component may be one of the shafts 14, 18, 22, 26, the output shaft of the transmission, the shafts of the axle to the wheels 32, or the motor 20. When launch clutch 24 is locked and there is no slip, a rotational speed of any driveline component downstream of the motor 20 can indicate the rotational speed of the motor 20 itself after taking into account gear ratios. Similarly, if the disconnect clutch 16 is locked and there is no slip, the rotational speed of the motor 20 can be indicated by the rotational speed of any driveline component between the engine 12 and the motor 20. Therefore, the rotational speed of the motor 20 can be determined by measuring the rotational speed of any driveline component. The speed of any driveline component may be measured while the launch clutch 24 is slipping or not slipping. However, if the speed is measured of a component downstream of the motor 20 (for example, transmission input shaft 26) while the launch clutch 24 is slipping, then the speed of the motor 20 may only be determined if the amount of clutch pressure is known.

At 102, the rotational speed of the driveline component is filtered. The filtering is described in further detail with respect to FIGS. 4B and 5, however a high level chart is illustrated in FIG. 3. The filtering at 102 may include sub-steps 104, 106 and 108. First, at 104, the rotational speed is filtered by a time-delayed adjustable rate filter. This yields a filtered rotational speed that reduces oscillating motor speed values. At 106, the difference between the filtered speed and the actual speed is integrated. This, multiplied by some gain, yields a correction factor. At 108, the correction factor is added to the filtered rotational speed, thus yielding a corrected desired motor speed. The corrected desired motor speed represents the desired speed of the motor without unwanted oscillations.

At 110, an error signal is created by subtracting the corrected desired motor speed from the actual rotational speed. This error signal may be multiplied by a gain to obtain a corrected torque value, as will be discussed.

At 112, it is determined whether or not the launch clutch 24 is slipping. This may be determined by any of a number of strategies, including comparing the speeds of the motor output shaft 22 and the transmission input shaft 26, measuring the pressure on the clutch 24, or by determining if the VSC 36 has commanded the launch clutch 24 to slip or to not slip. This determination of whether the launch clutch 24 is slipping is for the purposes of deciding how to alter torque to the wheels 32 to dampen the driveline oscillations. If the launch clutch 24 is slipping, at 114, the VSC 36 sends a pressure command signal to alter the pressure of the launch clutch 24. By altering the pressure of the launch clutch 24, the torque at the wheels 32 is consequently altered. Likewise, if the launch clutch 24 is not slipping, at 116, the VSC 36 sends a torque command signal to the motor 20 to alter the motor torque. Because the launch clutch 24 is not slipping, the adjustment of the torque of the motor 20 to correspond to the oscillations of the driveline consequently alters the torque transmitted to the wheels 32. The system returns at 118 to continuously monitor and dampen driveline oscillations throughout operation of the vehicle.

Figure 4A:
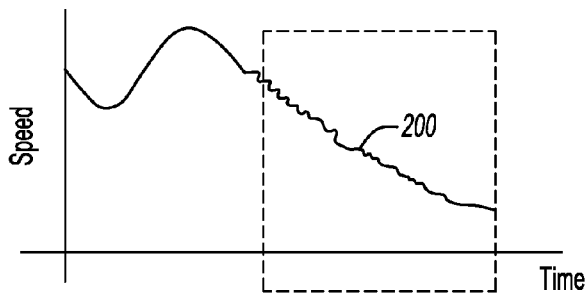
FIG. 4A is a graphical representation of traction motor speed over time with oscillations present in the driveline.
Figure 4B:
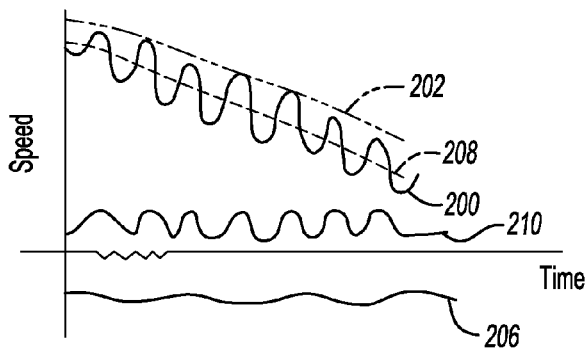
FIG. 4B is a graphical representation of traction motor speed compared with a filtered motor speed according to embodiments of the present disclosure.
Figure 4C:
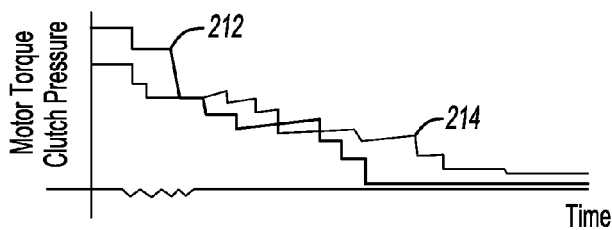
FIG. 4C is a graphical representation of a traction motor torque signal and a modified or corrected torque signal to reduce driveline oscillations according to embodiments of the present disclosure.

Referring to FIGS. 4A-C, the filtering and torque adjustment is graphically illustrated. Reference herein is made to motor speed oscillations. However, it should be understood that measuring motor speed may be advantageous only in the case of when the launch clutch 24 is not slipping because rotational speed anywhere along the driveline indicates rotational speed of the motor 20. It may be advantageous to base the torque adjustment on the rotational speed of the input shaft 26 of the transmission 28 when the launch clutch 24 is slipping, as increasing the torque of the motor 20 when the launch clutch 24 is slipping may not adequately adjust torque at the wheels 32. It is contemplated that the measurement of rotational speed may take place at only one driveline component, but reference is made to a motor speed in FIGS. 4A-C for simplicity.

FIG. 4A shows motor speed versus time, indicated at 200. As the motor speed 200 decreases after a gear shift, for example, oscillations in the motor speed exist. As explained previously, this may result in unwanted vibrations experienced by an operator of the vehicle. This is one illustration of driveline oscillations; it is also contemplated that driveline oscillations and the corresponding dampening system may be advantageous in many other situations, for example, as the motor speed 200 is increasing. It is also contemplated that motor speed request signals sent to the motor may undergo light filtering to eliminate spikes of motor speed, and this light filtering is a product that results in the actual motor speed 200 versus time in FIG. 4A. FIGS. 4B and 4C focus on the oscillating segment of the motor speed 200 of FIG. 4A.

FIG. 4B illustrates the filtering system as previously described with reference to steps 102-110 of FIG. 3. A more detailed description is provided with reference to the algorithm illustrated in FIG. 5. Referring to FIGS. 3 and 4B, the measured speed 200 of the motor 20 is shown. The motor speed 200 is then filtered to essentially yield an average or mean of previous values of rotational speed. A plot of this filtered rotational speed 202 represents a smoothed, time-delayed plot compared to a plot of the actual motor speed 200. At step 106, the difference between the filtered motor speed 202 and the actual motor speed 200 is integrated to compute a correction factor 206. This correction factor 206 is then added to the filtered speed 202 to effectively shift the filtered motor speed 200. The shifted filtered motor speed represents a smoothed motor speed that is not time-delayed from the actual motor speed. This may be referred to as the "corrected desired motor speed" 208.

Once the corrected desired motor speed 208 is determined, the torque of the motor or the pressure of the clutch can be adjusted, depending on whether or not the launch clutch 24 is slipping, as described previously. To do so, an error or difference signal 210 is created. The error or difference signal 210 is defined by the difference between the corrected desired motor speed 208 and the actual motor speed 200. The error signal 210 is multiplied by a gain to convert the error signal into a torque correction signal (FIG. 4C). This torque correction signal is added to the torque demand of the motor 20 or the launch clutch 24, again depending on whether or not the launch clutch 24 is slipping.

Referring to FIG. 4C, motor torque (or clutch pressure in one embodiment) without damping 212 is shown in comparison with motor torque with damping 214. The torque correction is added to (or subtracted from) the original torque request of the motor to create a new torque request 214 to dampen oscillations. The new dampened torque request 214 is received by the motor 20 or the launch clutch 24, which in turn alters the final torque received at the wheels 32. Altering the torque (or clutch pressure in one embodiment) based upon a difference between a rotational speed of a driveline component and a filtered rotational speed of the driveline component thus dampens driveline oscillations perceived by an occupant of the vehicle.

Figure 5:
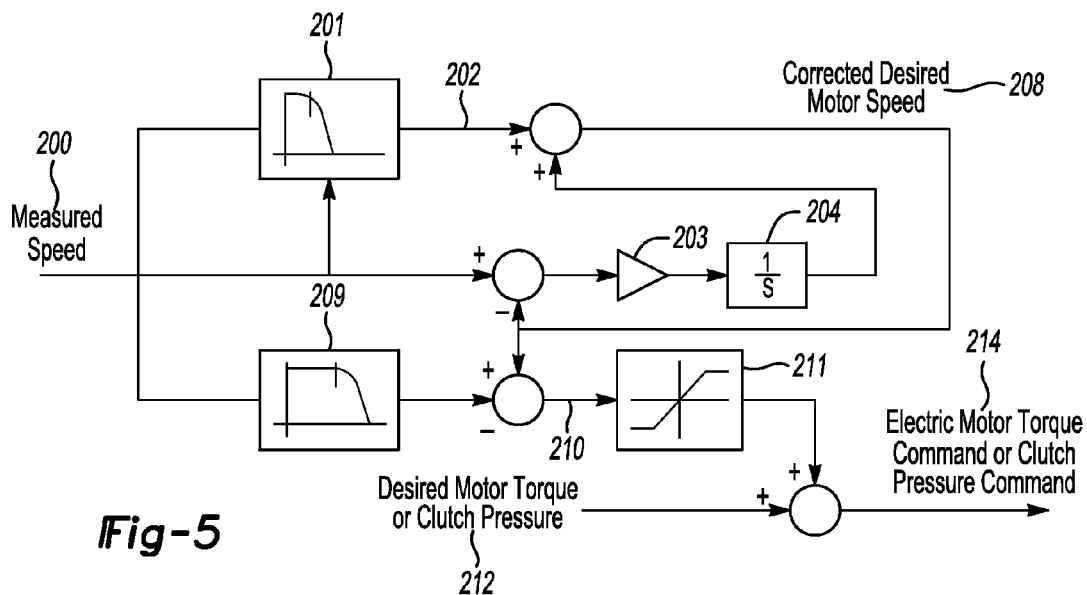
FIG. 5 is a diagram illustrating operation of a system or method for modifying traction motor torque to reduce or dampen driveline oscillations according to embodiments of the present disclosure.

Referring to FIG. 5, the filtering method of step 102 and corresponding illustrations of FIGS. 4B-4C will now be described in further detail. Reference numbers in FIG. 5 correspond to the signals of FIGS. 4A-4C. First, the speed of the motor 20 or other driveline component is measured at 200. The measured speed 200 is low-pass filtered by an infinite impulse response filter 201. The filter 201 has a cutoff frequency that depends on the value of the measured speed 200, with higher measured speeds having less filtering. The filter 201 may, for example, have a filter output value defined as: $Filter_{output} = k * \omega_{motor} + (1-k) * Past\_Filter_{Outputs}$, where k is an adjustable value as a function of the motor speed $\omega_{motor}$. The output of the filter 201 is a smoothed representation of the speed of the motor, but is uncorrected in that it is shifted in mean value from the speed of the motor due to time delay caused by the filtering at 201.

To restore the mean value of the uncorrected filtered speed 202, the difference 203 between the measured speed 200 and the uncorrected filtered speed 202 is integrated at 204. The result of the integration is the mean restoring correction factor 206. The correction factor 206 is added to the uncorrected filter speed 202 to result in the corrected desired motor speed 208.

To alter the torque of the vehicle based on the corrected desired motor speed 208, the measured speed 200 is low-pass filtered by a second infinite impulse response filter 209. The filter 209 has a cutoff frequency that has a calibration constant substantially higher than the cutoff frequency of the first filter 201. The output of the filter 209 is subtracted from the corrected desired motor speed 208 to create a speed error signal 210. The error signal 210 is proportional to the disturbances caused by the driveline oscillations. The error signal 210 is then limited in authority at 211 before being added to the desired motor torque 212 (or desired clutch pressure), thus changing the motor torque command 212 (or clutch pressure command). The changed motor torque command 212 (or clutch pressure command) results in a torque command signal (or clutch pressure command signal) that includes damping, shown at 214.

As such, various embodiments according to the present disclosure provide driveline torque management to reduce or eliminate driveline oscillations that may otherwise result from transmission ratio changes, particularly during regenerative braking of an electric or hybrid electric vehicle. The torque management strategy may be used in response to any gear change or disturbance when a vehicle launch clutch is locked, such as power-on gear changes and after engine pull-up, for example. In addition, various embodiments use rotational speed of only a single driveline component, such as the traction motor, to modify traction motor torque and improve drivability by reducing or eliminating driveline oscillations.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A computerized method for controlling a vehicle having a traction motor selectively coupled to an engine via a first coupling member and to a transmission via a second coupling member, the method comprising:
   via a controller, modifying traction motor torque while the second coupling member is engaged based on a difference between a rotational speed of a driveline component and a filtered rotational speed of the driveline component to reduce driveline oscillations; and
   via the controller, modifying pressure in the second coupling member while the second coupling member is at least partially disengaged based on the difference, wherein the driveline component is a transmission component when the second coupling member is at least partially disengaged.

2. The method of claim 1 wherein the driveline component comprises a traction motor output shaft when the second coupling member is engaged.

3. The method of claim 1 further comprising:
   filtering the rotational speed of the driveline component using a first low-pass filter having a cutoff frequency that varies as a function of the rotational speed of the driveline component.

4. The method of claim 3 further comprising:
   filtering the rotational speed of the driveline component using a second low-pass filter having a fixed calibratable cutoff frequency higher than the cutoff frequency of the first low-pass filter.

5. The method of claim 4 wherein modifying the traction motor torque includes integrating the difference between the rotational speed and the filtered rotational speed, the method further comprising:
   modifying the traction motor torque in response to a difference between output of the second low-pass filter and the integrated difference between the rotational speed and the filtered rotational speed.

6. The method of claim 1 wherein modifying the traction motor torque comprises modifying the traction motor torque in response to a ratio change of the transmission.

7. The method of claim 1 wherein modifying the traction motor torque comprises modifying the traction motor torque in response to activation of a vehicle regenerative braking system.

8. A system for controlling a powertrain of a vehicle, comprising:
   a traction motor selectively coupled to an engine by a first coupling member and to a transmission by a second coupling member; and a controller programmed to,
- while the second coupling member is engaged, modify traction motor torque based on a difference between a rotational speed of a driveline component and a filtered rotational speed of the driveline component to reduce driveline oscillations, and
- while the second coupling member is slipping, modify pressure in the second coupling member based on the difference to reduce driveline oscillations, wherein the driveline component is a transmission component when the second coupling member is slipping.

9. The system of claim 8 wherein the controller filters the rotational speed of the driveline component using a first low-pass filter having a cutoff frequency that varies as a function of the rotational speed of the driveline component.

10. The system of claim 9 wherein the controller filters the rotational speed of the driveline component using a second low-pass filter having a cutoff frequency higher than the cutoff frequency of the first low-pass filter.

11. The system of claim 8 wherein the controller modifies the traction motor torque in response to a ratio change of the transmission.

12. The system of claim 11 further comprising a regenerative braking system, wherein the controller modifies the traction motor torque in response to activation of the regenerative braking system.

13. A hybrid electric vehicle, comprising:
an engine;
a traction motor selectively coupled to the engine by a first clutch, and selectively coupled to a transmission by a second clutch; and
a controller programmed to, based on a difference between a rotational speed of a driveline component and a filtered rotational speed of the driveline component, modify motor torque when second clutch is locked and modify second clutch pressure when the second clutch is slipping.

14. The vehicle of claim 13 wherein the second clutch is disposed within the transmission.

15. The vehicle of claim 13 wherein the driveline component comprises an output shaft of the traction motor.

16. The vehicle of claim 13 wherein the controller comprises:
a first low-pass filter having a cutoff frequency that varies as a function of the rotational speed of the driveline component; and
a second low-pass filter having a cutoff frequency higher than the cutoff frequency of the first low-pass filter.

\* \* \* \* \*